(12) United States Patent
Carter et al.

(10) Patent No.: US 8,327,417 B2
(45) Date of Patent: *Dec. 4, 2012

(54) REMOTE AUTHORIZATION FOR OPERATIONS

(75) Inventors: Stephen R Carter, Spanish Fork, UT (US); Lloyd Leon Burch, Payson, UT (US)

(73) Assignee: Novell, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/871,163

(22) Filed: Aug. 30, 2010

(65) Prior Publication Data

US 2010/0325693 A1 Dec. 23, 2010

Related U.S. Application Data

(62) Division of application No. 11/392,195, filed on Mar. 29, 2006, now Pat. No. 7,810,139.

(51) Int. Cl.
*G06F 17/00* (2006.01)
*G06F 21/00* (2006.01)

(52) U.S. Cl. ............. 726/1; 726/2; 726/3; 726/4; 726/5; 726/6; 713/182; 713/183; 713/184; 713/185

(58) Field of Classification Search ............ 726/14, 726/21, 1–6; 713/1, 2, 100, 168, 182–185
See application file for complete search history.

(56) References Cited

U.S. PATENT DOCUMENTS

| | | | |
|---|---|---|---|
| 4,386,233 A | 5/1983 | Smid et al. | |
| 5,548,721 A | 8/1996 | Denslow | |
| 5,742,756 A | 4/1998 | Dillaway et al. | |
| 5,970,149 A | 10/1999 | Johnson | |
| 5,982,892 A | 11/1999 | Hicks et al. | |
| 6,073,237 A | 6/2000 | Ellison | |
| 6,192,405 B1 | 2/2001 | Bunnell | |
| 6,374,355 B1 | 4/2002 | Patel | |
| 6,567,793 B1 * | 5/2003 | Hicks et al. | 705/51 |
| 6,647,494 B1 | 11/2003 | Drews | |
| 6,772,350 B1 | 8/2004 | Belani et al. | |
| 6,934,855 B1 * | 8/2005 | Kipnis et al. | 726/20 |
| 6,944,777 B1 | 9/2005 | Belani et al. | |

(Continued)

FOREIGN PATENT DOCUMENTS

EP 1841181 A2 10/2007

(Continued)

OTHER PUBLICATIONS

Ray Snouffer et al, A comparision of the security requirements for cryptographic modules in FIPS 140-1 and FIPS 140-2, pp. 1-31, NIST Special Publication 800-29, 2001.*

(Continued)

*Primary Examiner* — Philip Chea
*Assistant Examiner* — Shanto M Abedin
(74) *Attorney, Agent, or Firm* — Schwegman, Lundberg & Woessner, P.A.

(57) ABSTRACT

Techniques for the remote authorization of secure operations are provided. A secure security system restricts access to a secure operation via an access key. An authorization acquisition service obtains the access key on request from the secure security system when an attempt is made to initiate the secure operation. The authorization acquisition service gains access the access key from a secure store via a secret. That is, the secret store is accessible via the secret. The secret is obtained directly or indirectly from a remote authorization principal over a network.

12 Claims, 5 Drawing Sheets

U.S. PATENT DOCUMENTS

| | | | |
|---|---|---|---|
| 6,954,740 B2 * | 10/2005 | Talker | 705/75 |
| 6,993,651 B2 | 1/2006 | Wray et al. | |
| 7,099,478 B2 | 8/2006 | Tomlinson | |
| 7,240,202 B1 | 7/2007 | Orman | |
| 7,278,023 B1 | 10/2007 | Siegel et al. | |
| 7,346,583 B2 | 3/2008 | Hicks et al. | |
| 7,370,351 B1 | 5/2008 | Ramachandran et al. | |
| 7,447,494 B2 | 11/2008 | Law et al. | |
| 7,577,621 B2 | 8/2009 | Dickinson et al. | |
| 7,647,256 B2 | 1/2010 | Burch et al. | |
| 7,810,139 B2 * | 10/2010 | Carter et al. | 726/4 |
| 2002/0049912 A1 | 4/2002 | Honjo et al. | |
| 2002/0138771 A1 | 9/2002 | Dutta | |
| 2003/0033535 A1 | 2/2003 | Fisher et al. | |
| 2003/0204722 A1 | 10/2003 | Schoen et al. | |
| 2004/0024764 A1 | 2/2004 | Hsu et al. | |
| 2004/0101139 A1 * | 5/2004 | Wack et al. | 380/277 |
| 2004/0203592 A1 | 10/2004 | Kermode et al. | |
| 2004/0243824 A1 * | 12/2004 | Jones | 713/200 |
| 2004/0250076 A1 | 12/2004 | Kung | |
| 2005/0044378 A1 | 2/2005 | Beard et al. | |
| 2005/0068983 A1 | 3/2005 | Cater et al. | |
| 2005/0102509 A1 | 5/2005 | Fascenda | |
| 2005/0171872 A1 | 8/2005 | Burch et al. | |
| 2005/0235352 A1 | 10/2005 | Staats et al. | |
| 2005/0256878 A1 * | 11/2005 | Brown et al. | 707/10 |
| 2005/0257246 A1 | 11/2005 | Adams et al. | |
| 2006/0059539 A1 | 3/2006 | Shashikumar et al. | |
| 2006/0085652 A1 * | 4/2006 | Zimmer et al. | 713/193 |
| 2006/0099965 A1 * | 5/2006 | Aaron | 455/456.3 |
| 2007/0234406 A1 | 10/2007 | Carter et al. | |

FOREIGN PATENT DOCUMENTS

| | | |
|---|---|---|
| WO | WO-0122651 A2 | 3/2001 |

OTHER PUBLICATIONS

Marc Laroche et al, Entrust Cryptographic Module 5.1 FIPS 140-1 Validation Security Policy, pp. 1-16, Entrust Technologies, 2000.*

"Cisco 7206 VXR Router Security Policy", FIPS 140-2 Nonproprietary Security Policy for Cisco 7206VXR, pp. 1-9, 2004.*

VPN-1 NG with Application Intelligence, FIPS 140-2 Non-Proprietary Security Policy, Level 2 Validation, pp. 1-30, Checkpoint Software Technologies Ltd, 2004.*

Entrust Cryptographic Module 6.0, FIPS 140-1 Validation Security Policy, Pierre Boucher, pp. 1-16, Entrust, 2003.*

SafeNet High Assurance 500/1000 Gateway Cryptographic Module, FIPS 140-2 Level-2 Validation, pp. 1-22, SafeNet Inc., 2005.*

Entity Authentication Using Public Key Cryptography, Federal Information Processing Standards Publication, pp. 1-50, FIPS PUB 196, 1997.*

"U.S. Appl. No. 11/392,195 Notice of Allowance mailed Aug. 23, 2010", 8 pgs.

"U.S. Appl. No. 11/392,195, Final Office Action mailed May 14, 2010", 14 pgs.

"U.S. Appl. No. 11/392,195, Non-Final Office Action mailed Oct. 20, 2009", 13 pgs.

"U.S. Appl. No. 11/392,195, Response filed Jul. 29, 2010 to Final Office Action mailed May 14, 2010", 6 pgs.

"U.S. Appl. No. 11/392,195, Response filed Jan. 20, 2010 to Non Final Office Action mailed Oct. 20, 2009", 12 pgs.

"Cisco 7206 VXR Router Security Policy", http://www.cisco.com/univercd/cc/td/doc/product/core/7200vx/misc/7206pol.htm, (2004), 1-9.

"European Application No. 07103082.9 Extended European Search Report", (Oct. 26, 2007), 13 pgs.

"Juniper Networks NetScreen Secure Access Series FIPS—Datasheet", http://www.juniper.net/products/ssl/dsheet/100085.pdf, (Jan. 2005), 1-4.

"Password Usage", Federal Information Processing Standards Publication 112, http://www.itl.nist.gov/fipspubs/fip112.htm, (May 30, 1985), 1-31.

"Remote Control and Security", http://sea.symantec.com/content/article.cfm?aid=162, (Copyright 1995-2006), 1-2.

"SafeNet HighAssurance Remote", http://www.cyprotect-dl.de/safenet/pdf/HighAssuranceRemote_ProductBrief.pdf, (2004), 1-3.

"Security requirements for cryptographic modules", FIPS Pub 140-2, Federal Information Processing Standards Publication, Information Technology Laboratory & National Institute of Standards and Technology, (May 25, 2001), 1-69.

"Security Requirements for Cryptographic Modules-", FIPS Pub 140-2, Federal Information Processing Standards Publication, (May 25, 2001), pp. 1-61.

Schneier, B, "", Applied Cryptography—Protocols, Algorithms, and Source Code in C, (1996), 47-65, 566.

Wetzel, J. A, et al., "Security Policy for IBM S/390 CMOS Cryptographic Coprocessor", Version 1.1, IBM, (1998), 1-16.

* cited by examiner

REMOTE AUTHORIZATION FOR OPERATIONS

This application is a divisional of U.S. patent application Ser. No. 11/392,195, filed on Mar. 29, 2006, now issued as U.S. Pat. No. 7,810,139, which is incorporated herein by reference in its entirety.

FIELD

The invention relates generally to security and more particularly to techniques for remote authorization for operations.

BACKGROUND

Electronic security is a very high priority within governments and enterprises. In fact, the United States (U.S.) federal government has promulgated stringent standards that seek to address electronic security for U.S. systems, devices, services, administrative agencies, organizations, etc. The Federal Information Processing Standard (FIPS) 140-2 addresses cryptographic standards for U.S. federal organizations. Security has always been a challenge but after the advent of Sep. 11, 2001, the U.S. government has placed even greater emphasis and resources on security issues.

One aspect of FIPS is that some automated process may not be started without security credentials. This entails having a role-based or identity-based individual being physically present and authenticated at the site of the system, having the automated process, to supply the credential information before the automated process may be started. It is clear that such a requirement has caused a lot of operational and logistical issues within the U.S. federal government and within enterprises (vendors) that do business with the U.S. government or supply security systems on behalf of the U.S. government.

To comply with FIPS, a small set of individual security positions have been created with proper clearance to supply security credentials. These individuals are referred to as Crypto Officers. Crypto Officers must be hands on for certain configuration and startup events of security systems. Unfortunately, this puts a severe strain and a lot of unnecessary demand on the limited Crypto Officers. In fact, the U.S. government is so concerned about the availability and presence of the Crypto Officers that no two officers having overlapping duties may be physically present in the same building. So, and quite literally, when one officer enters a building, another officer present exits the building.

Because of this stringent policy, a common practice among government vendors is to have two modes of operation for their systems: a FIPS mode and a non-FIPS mode. If a FIPS mode of operation is used, then a Crypto Officer must be physically present at the site or device of the system for startup of a particular operation or service. In a non-FIPS mode of operation, the operation or service may be started without the presence of the Crypto Officer that supplies the credentials.

So in practice, the FIPS mode of operation permits a vendor to receive the necessary certifications and grades from a reviewing federal agency to get their services and products in the door. However, the FIPS mode may never actually be started or configured with the product or service of the vendor for the federal government because of the perceived operational issues that may quite literally require a Crypto Officer to be employed and be physically present on site of the vendor or the deployed location of the product or service 24 hours a day and 7 days a week (24×7).

To complicate matters further, a Crypto Officer has to be certified and cleared for each system that is to be under the control of the Crypto Officer. Thus, not just any Crypto Officer has to be available when a system is down; rather, a specifically certified Crypto Officer for the system that is down has to be available when that system is down.

Thus, what is needed is a mechanism, which allows a certified and qualified Crypto Officer(s) to remotely provide security credentials, where those security credentials are necessary for permitting secured systems to acquire remote authorizations in order for the secured systems to be operated in accordance with security policy.

SUMMARY

In various embodiments, techniques for acquiring remote authorization to initiate secure operations are provided. More specifically, and in an embodiment, a method for acquiring an access key to remotely authorize the initiation of a secure operation. A request is received for authorization to initiate an operation of a security system. A remote authorization principal is notified of the request and a secret is acquired in response to that notification. Next, an access key is acquired in response to the secret and the access key is submitted to the security system for purposes of initiating the operation.

DETAILED DESCRIPTION

A "resource" includes a user, content, a processing device, a node, a service, a system, a directory, a data store, groups of users, combinations of these things, etc. A "principal" is a specific type of resource that has one or more unique identities. An "authorized principal" is a specific type of resource that has had one of its identities authenticated for interacting with a given resource or a given set of resources. According to an embodiment, an authorized principal is a FIPS compliant Crypto Officer that is certified for a given resource, where that given resource is a security system desiring an initiation of a secure operation.

An authorized principal is remote if for a given transaction that authorized principal is not physically and geographically present at the resource or set of resource with which the authorized principal is authenticated. Stated another way, the authorized principal is remote if a Wide Area Network (WAN), such as the Internet, a telephone network, or other network is used for the authorized principal to directly or indirectly communicate with the resource or set of resources. The use of the term "remote" is relative, such that the authorized principal is remote to the resource or resources from the perspective of the resources; yet, from the perspective of the authorized principal the resource or resources are remote from authorized principal.

Direct or indirect communication between the authorized principal and its resource (security system) is secure. So, the network may be secure, such as a dedicated transmission line, and/or the network may be insecure but use secure communications, such as encryption, Virtual Private Networks, and the like. There may also be a variety of combinations of secure and insecure networks utilizing secure communications during any particular direct or indirect communication between the authorized principal and the security system.

Various embodiments of this invention can be implemented in existing network architectures, security systems, and/or communication devices. For example, in some embodiments, the techniques presented herein are implemented in whole or in part in the Novell® network, proxy server products, email products, operating system products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

Figure 1:
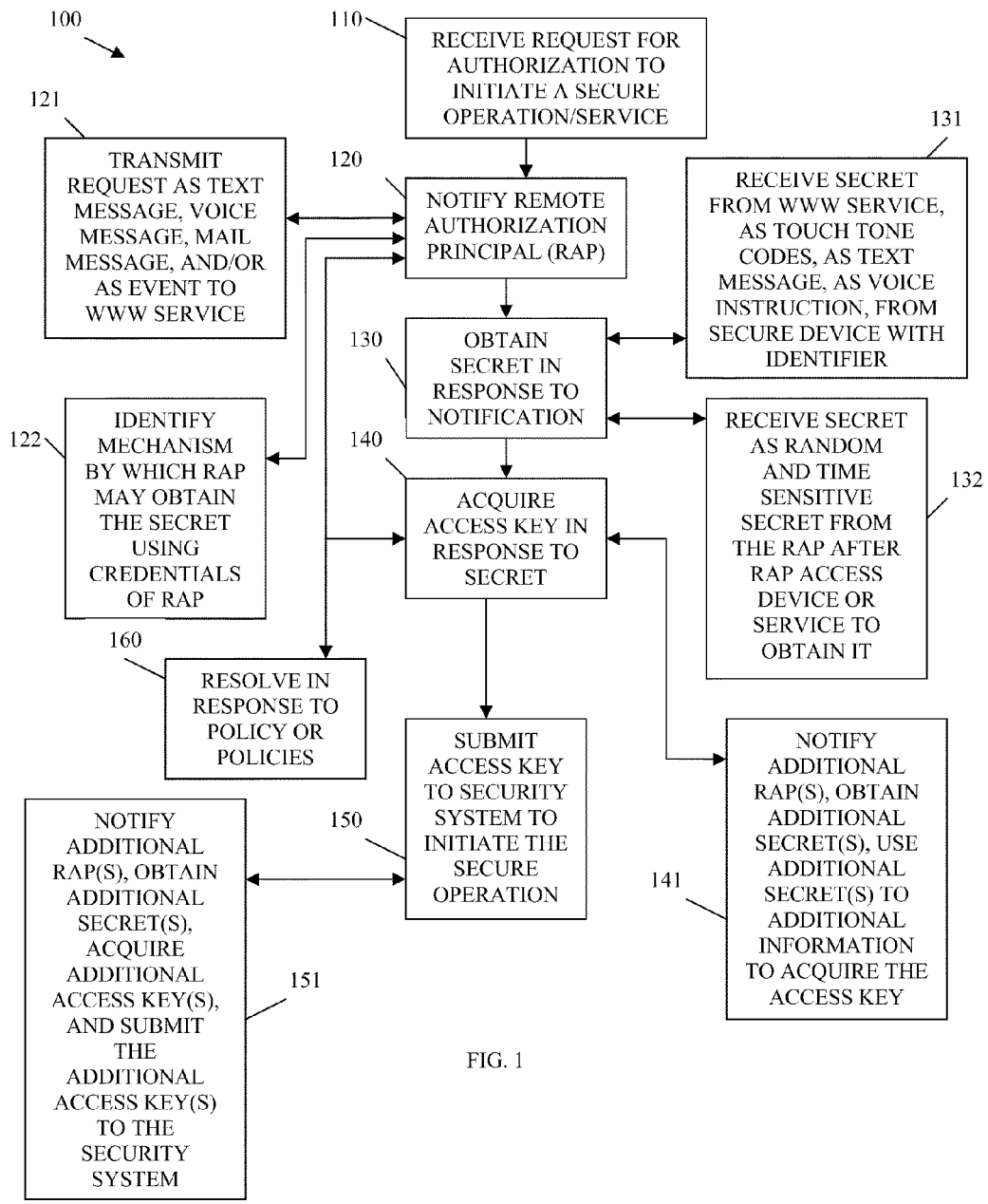
FIG. 1 is a diagram of a method for acquiring an access key to remotely authorize the initiation of a secure operation, according to an example embodiment.

FIG. 1 is a diagram of a method 100 for acquiring an access key to remotely authorize the initiation of a secure operation, according to an example embodiment. The method 100 (hereinafter "authorization acquisition service") is implemented in a machine-accessible and readable medium. The authorization acquisition service is operational over and processes within a network. The network may be wired, wireless, or a combination of wired and wireless. The authorization acquisition service reflects an intermediary service that permits a remote authorization principal to indirectly communicate with a security system for purposes of initiating a secure operation under control of the security system.

At 110, the authorization acquisition service receives a request for authorization to initiate a secure operation. The secure operation may be related to startup of a secure system or device or may be related to a specific secure feature of a service that is already processing within the secure system or secure device. The request for authorization is received from a security system or service. It is noted that the terms service, system, and even operation may be used interchangeably herein. So, the secure operation may be viewed as a sub service or a larger secure system or service.

The receive request may include a variety of additional information. For example, the security system may communicate a policy to the authorization acquisition service indicating who should be consulted to assist in obtaining the access key needed for initiating the secure operation. The policy may also communicate the technique and devices that the authorization acquisition service should consult to acquire the access key. In some cases, some or all of this information may be preconfigured within the authorization acquisition service, such that it is not associated with the request and dynamically communicated with the request from the security system.

At 120, the authorization acquisition service notifies a remote authorization principal (RAP) of the request by the security system. This prompts the RAP to deliver or cause to be delivered a secret. The secret is known or accessible only to the RAP and not the authorization acquisition service. The authorization acquisition service uses the secret obtained from the RAP as a key to open a secret store or lock box for purposes of acquiring the access key. The access key is used by the security system to authorize the initiation of the secure operation within the security system. The various details and interactions of this processing will now be discussed in greater detail.

According to an embodiment, at 121, the request may be reformatted and augmented or just forwarded to the RAP by the authorization acquisition service in a variety of formats or combinations of formats. So, the request may be sent to the RAP or a device of the RAP (such as for example a cell phone) as a text message, a voice message, an email to an email account of the RAP, an event to a World-Wide Web (WWW) service, etc.

As was mentioned above, the request may be sent via multiple formats or channels and may be augmented with additional information. So, the authorization acquisition service may send a text message to an RAP on its phone indicating that the security system is down and there is an authorized request to initiate a startup procedure (secure operation) at the same time a voice message may be sent to the RAP informing the RAP of a random passkey to use with the RAP's credentials to gain access to a random key generator or service and acquire the desired secret that the authorization acquisition service desires to unlock a secret store and get the access key. It should be kept in mind that this is but one example and that a variety of permutations may exist and used with the teachings presented herein.

According to another embodiment, at 122, the authorization acquisition service may also identify the mechanism by which the RAP may obtain the secret that is desired using credentials of the RAP. An example, of this was supplied above. The authorization acquisition service may work in cooperation with the RAP to acquire the secret that the authorization acquisition service desires, such that neither may obtain the secret only without at least some assistance from the other.

At 130, the authorization acquisition service obtains the desired secret from the RAP in response to the notification that was sent to the RAP at 120. The secret may be received in a variety of formats and either directly from the RAP or indirectly from the RAP in response to actions of the RAP with secure devices and/or services. Delivery may be simple or complex. Moreover, delivery itself may be driven by policy and communicated dynamically from the authorization acquisition service to the RAP.

For example, at 131, the secret may be received as a touch tone response from a cell phone or communication device of the RAP in response to the notification. Alternatively, at 131, the secret may be received from a secure WWW service that the RAP access with a pass key, which upon access causes the WWW service to deliver the secret to the authorization acquisition service. In this latter case, the RAP may never know what the secret was and may not care, but the RAP and the RAP's credentials were needed to cause the secret to be delivered to the authorization acquisition service. In still another situation, at 131, the authorization acquisition service may receive the secret as a text message, as an email message, or event as a voice message (the voice message may be analyzed for voice pattern recognition associated with the RAP). Thus, biometrics may also be used to authenticate responses having the secret as being from the RAP. In another case, at 131, the authorization acquisition service may receive the secret directly from a secure device activated by the RAP in response to the request. So, the RAP may use a smart card or memory device to obtain or generate the secret and interface a reader or network interface to a network where the secret is obtained and sent either directly to the authorization acquisition service or to another service and then to the authorization acquisition service.

In an embodiment, at 132, the authorization acquisition service may receive the secret as a random and/or optionally a time sensitive or dependent secret. So, the RAP may access a device or service to obtain the secret and then that secret is either communicated by the RAP or by another device or service to the authorization acquisition service. Examples of this were discussed above.

At 140, the authorization acquisition service acquires the access key in response to a successfully received secret. That is, the secret serves itself as a key to unlock a secret store, service, or device, where the true access key is acquired.

According to an embodiment, at 141, it may be that the lock box, secret store, service, or device that has the access key requires more than one secret from more than one RAP to open up and supply the desired access key. Thus, the authorization acquisition service may simultaneously perform the processing discussed with respect to 120-140, at 141, with one or more additional RAP's and may use the additional secret(s) to completely unlock and obtain the access key.

It is noted, that in some cases the secret obtained, at 130, is the desired access key which is acquired, at 140. So, the RAP may directly supply the access key in cases where the secret is in fact the access key. Policy may notify the authorization acquisition service that the RAP is directly supplying the desired access key, such that the authorization acquisition service recognizes the secret obtained as the access key.

At 150, the authorization acquisition service submits the access key to the security system for purposes of initiating the secure operation. It is noted that the access key may be regularly changing and using a mechanism to change that is known only to the secret store housing the access key and the security system. The secret store and the security system may then be time synchronized with one another, such that at any particular point in time both of them possess the same access key. The security system does not permit the secure operation to be initiated without the authorization acquisition service delivering a valid access key that authorizes the initiation of the secure operation within the security system.

In an embodiment, at 151, the authorization acquisition service may, pursuant to policy, be required to acquire multiple access keys to successfully authenticate the secure operation for initiation within the security system. In such a case, the authorization acquisition service may concurrently or simultaneously perform the processing of 120-140, at 151 to acquire multiple different access keys, each of which are needed by the security system to permit the secure operation to proceed. Note that this is different from the processing at 141 in that multiple secrets from multiple RAP's at 141 were used to obtain a single access key; however, at 151, multiple secrets from multiple RAP's are used to obtain multiple access keys.

As was mentioned above, a variety of the processing of the authorization acquisition service may be driven by policies. The policies may be predefined and configured within the authorization acquisition service or may be dynamically communicated and communicated in real time to the authorization acquisition service from the security system. Accordingly, in an embodiment, at 160, the processing at 120 and 140 may be driven in response to static or dynamic policies.

The processing technique of the authorization acquisition service permits FIPS 140-2 security to occur with remote or roaming Crypto Officers that do not have to physically and geographically present at the security system to initiate a secure operation when needed. Additionally, the processing technique provides for enhanced security for authorizing any secure operation remotely in a geographically independent manner.

Figure 2:
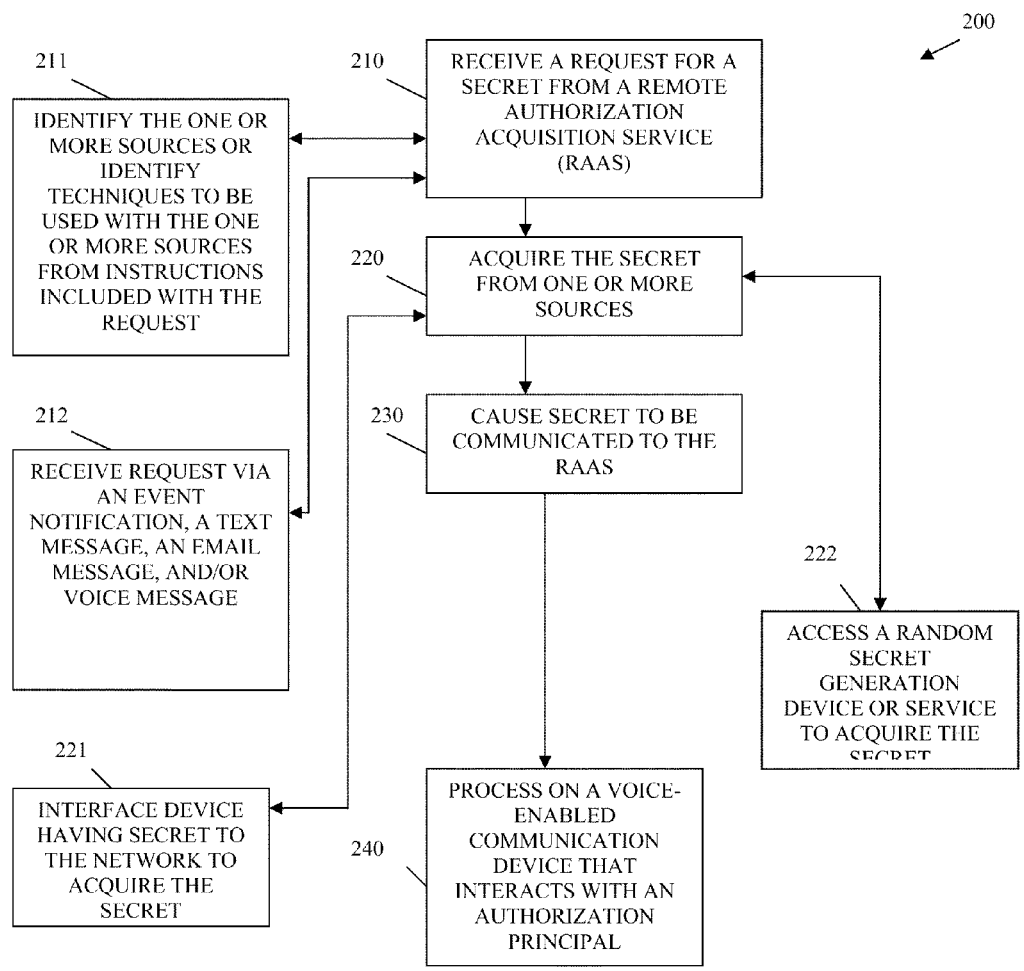
FIG. 2 is a diagram of method for remotely supplying a secret used to acquire the access key described with the processing of the FIG. 1, according to an example embodiment.

FIG. 2 is a diagram of method 200 for remotely supplying a secret used to acquire the access key described with the processing of the FIG. 1, according to an example embodiment. The method 200 (hereinafter "remote authorization principal (RAP) device service" is implemented in a machine-accessible and readable medium and is operational over a network. The network may be wired, wireless, or a combination of wired and wireless.

According to an embodiment, remote authorization principal device service interacts with the authorization acquisition service represented by the method 100 to supply a secret that the authorization acquisition service uses to acquire an access key that is supplied to the security system to initiate the secure operation.

At 210, the RAP device service receives a request for a secret from a remote authorization acquisition service (RAAS), such as the RAAS represented by the method 100 of the FIG. 1. The RAP device service processes on a device that interacts with an RAP. According to an embodiment, the RAP is a FIPS 140-2 compliant Crypto Officer and the device that the RAP device service processes on is a cell phone or a voice-enabled communication device that interacts with and is operated by the RAP. Thus, in an embodiment, at 240, the RAP device service processes on a voice-enabled communication device, such as but not limited to a voice over the Internet Protocol (IP) (VoIP) phone, a cell phone, a satellite phone, etc.

According to an embodiment, at 211, the identity of the sources that have the secret may be unknown to the RAP device service before receipt of the request. That is, the request itself may identify the identity of the sources having the secret and may also identify the technique that the RAP device service is to use to acquire the secret from the one or more sources. Thus, a key may be provided to the RAP device service and that key unlocks a source and causes the source to produce the desired secret.

In an embodiment, at 212, the RAP device service may also receive the request initially in a variety of disparate formats or a combination of formats and/or channels. So, the request may be received from the RAAS directly as a text message, an email, a voice message, or various combinations of these things. Alternatively, the request may be received indirectly from the RAAS via a service that the RAAS activates causing that service to raise an event or event code to the RAP device service.

At 220, the RAP device service acquires a secret from one or more sources in response to the request received from the RAAS. This may occur in a variety of manners and via a variety of mechanisms. For example, at 221, the RAP device service may interface a device or service with the network to acquire the secret. That is, the RAP device service may activate or cause to be activated a device or service that supplies the secret over the network. The secret may be directly supplied back to the RAP device service or may be supplied to the RAAS independent of the RAP device service after the RAP device service caused the device or service to generate and/or produce the desired secret.

As another example, at 222, the RAP device service may access a random secret generation device or service for purposes of acquiring the secret desired by the RAAS. The RAP device service may not know in advance the secret and may not ever know the secret if the random device or service directly delivers the produced or generated secret to the RAAS on behalf of the RAP device service.

Once the secret is generated, at 230, the RAP device service causes the secret to be communicated to the RAAS. The RAP device service may directly supply this secret to the RAAS. Alternatively, the RAP device service may initiate and cause other devices or services to deliver the secret directly to the RAAS on behalf of the RAP device service. Example scenarios for this were discussed above.

It is noted that acquiring the secret need not be complex and may be straightforward. So, for example, a source may be a Crypto Officer having information in his head that is acquired at 220 by that officer inputting it into a device that the RAP device service is processing on, such as a cell phone. The RAP device service may then directly supply the secret over the network to the RAAS at 230. Of course much more complicated and varied situations and processing may occur as was described above. It is also worthy to note that each request for a secret for even the same secure operation may be varied, such that the exact processing flow is random. In such cases, the processing at 211 permits the RAP device service to dynamically adjust and account for varying processing flows used to acquire the desired secret.

Once the RAP device service delivers or causes to be delivered the secret, the processing of the RAAS uses the secret to acquire an access key from a secret store and delivers the access key to the security system. The security system then authenticates the access key and if verified initiates the secure operation within the security system. The processing with respect to the RAAS was described above with respect to the method 100 of the FIG. 1 and some example processing of the security system is described below with respect to the method 300 of the FIG. 3.

Figure 3:
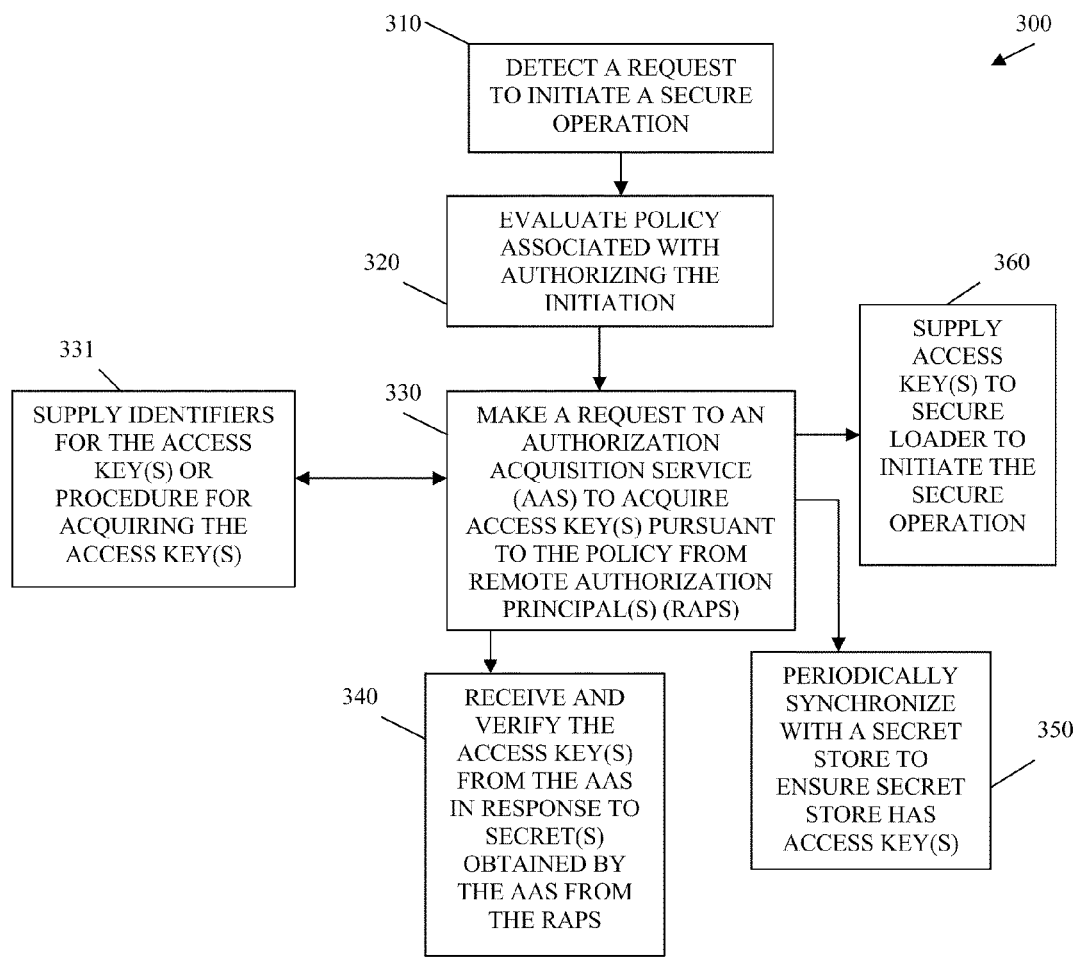
FIG. 3 is a diagram of a method for initiating a secure operation in response to the access key described with the processing of the FIG. 1 and obtained from the secret supplied with the processing of the FIG. 2, according to an example embodiment.

FIG. 3 is a diagram of a method 300 for initiating a secure operation in response to the access key described with the processing of the FIG. 1 and obtained from the secret supplied with the processing of the FIG. 2, according to an example embodiment. The method 300 (hereinafter "security system service" is implemented in a machine-accessible and readable medium and is operational over a network. The network may be wired, wireless, or a combination of wired and wireless.

According to an embodiment, the security system service represents processing of a security system that controls and determines whether a secure operation is initiated. The security system service interacts directly with the authorization acquisition service represented by the method 100 of the FIG. 1 and indirectly with the remote authorization principal device service represented by the method 200 of the FIG. 2. The security system service may be implemented as a sub service or enhancement to an existing security system so that it is designed to interact with the authorization acquisition service (AAS), such as the AAS represented by the method 100 of the FIG. 1.

At 310, the security system service detects a request to initiate a secure operation within a security system. This can occur in a variety of manners. For example, there may be an attempt to boot up a device or services associated with the security system. The secure operation does not have to be a startup operation; that is, it may be a request to execute an operation that requires extraordinary security precautions. In a military situation this may be an operation that raises a threat level or that initiates some kind of strike. In other cases, the secure operation may actually be a shutdown of a running service or process. So, the secure operation can be any operation that requires or is associated with extraordinary authorization procedures before that secure operation is initiated within the security system.

At 320, the security system service evaluates policy associated with authorizing the initiation. So, the security system being monitored by the security system service may include a variety of secure operations each of which may have different levels or security procedures. A policy may be associated with a single secure operation or a group of select secure operations. The policy may drive the processing flow and content of information communicated and expected by the security system service before any given secure operation is properly authenticated and initiated after a request to do the same is detected.

At 330, the security system service makes a request to an AAS for an access key or set of access keys pursuant to instructions defined in the policy evaluated at 320. Thus, the policy may indicate that one or more access keys are needed to properly authenticate the request for initiating the secure operation and the security system service asks the AAS to attempt to acquire the access key or keys. If the AAS is unable to acquire the access key or keys then the secure operation will not be initiated. In some cases, the policy may put time limits on the elapsed amount of time for the AAS to deliver the access key or keys and if there is no delivery during that elapsed period of time, then any access key or keys delivered after that time will be ignored or considered void.

According to an embodiment, at 331, the security system service may also include a variety of dynamic and real time information in the request to the AAS for the access key or keys. So, the security system service may actually identify the access key or keys that it needs to authenticate the secure operation. The identifier may identify a type or name for a given access key or access keys. The AAS may then be configured to identify specific RAPS in response to these identifiers and follow its own procedures for eventually acquiring the access key or keys. In a similar manner, the security system service may also identify a procedure for the AAS to follow in collecting the access key and that procedure may be randomly altered by the security system service. For example, a procedure may indicate which lock box or secret store that the AAS is to use to acquire the access key or keys and/or may indicate which random secret or key generation service a RAP should access to acquire a time-sensitive secret that the AAS may then use to access the secret store. A variety of procedures and processing flows may be embodied in the request from the security system service to the AAS. Each of which are intended to fall within the scope of the disclosure presented.

The request made from the security system service to the AAS results in the AAS interacting with one or more RAP's in the manner discussed above with respect to the method 100 of the FIG. 1. The interactions of devices or services of the RAP were also described with respect to the method 200 of the FIG. 2.

At 340, the security system service may receive a requested access key or keys from the AAS in response to successfully processing of the AAS to acquire secrets from one or more RAP's. The access keys or keys are then authorized or verified by the security system service and, assuming success, the secure operation is initiated within the security system.

In an embodiment, at 350, the security system service may periodically synchronize with one or more secret stores to ensure the access key or keys are even more secure and non reproducible by intruders. For example, the security system service and a secret store may each randomly generate access keys on a regular basis (e.g., every 10 minutes). The security system service and the secret store may use the same random key generator and they may be clock synchronized with one another and periodically synchronize clocks with one another. So, the keys are never transferred between the two but clock or time settings are in a regular fashion. Thus, at any particular point in time, the security system service and the secret store are recognizing the same access key. It is also noted that the security system service may not have to store the access key, that is a hash for the access key or even the access key itself may be generated upon request. This provides for even greater security.

In some cases, at 360, the security system service may supply the access key or keys to a secure loader for verification and for initiation of the secure operation. So, the verification of the access key and initiation of the secure operation may be further delegated to a secure service or module within the security system service.

It is noted that the methods 100, 200, and 300 may be implemented within machine-accessible or device-accessible media as instructions. The instructions when executed by a machine performing the processing of the methods 100, 200, and 300 depicted in the FIGS. 1-3, respectively. The media may be removable; such that when it is interfaced to the machine the instructions are uploaded to the machine and processed. The media may be prefabricated with the instructions within the machine within the memory and/or storage. Still further, the media may be associated with a remote network machine and downloaded to another processing machine for execution.

Figure 4:
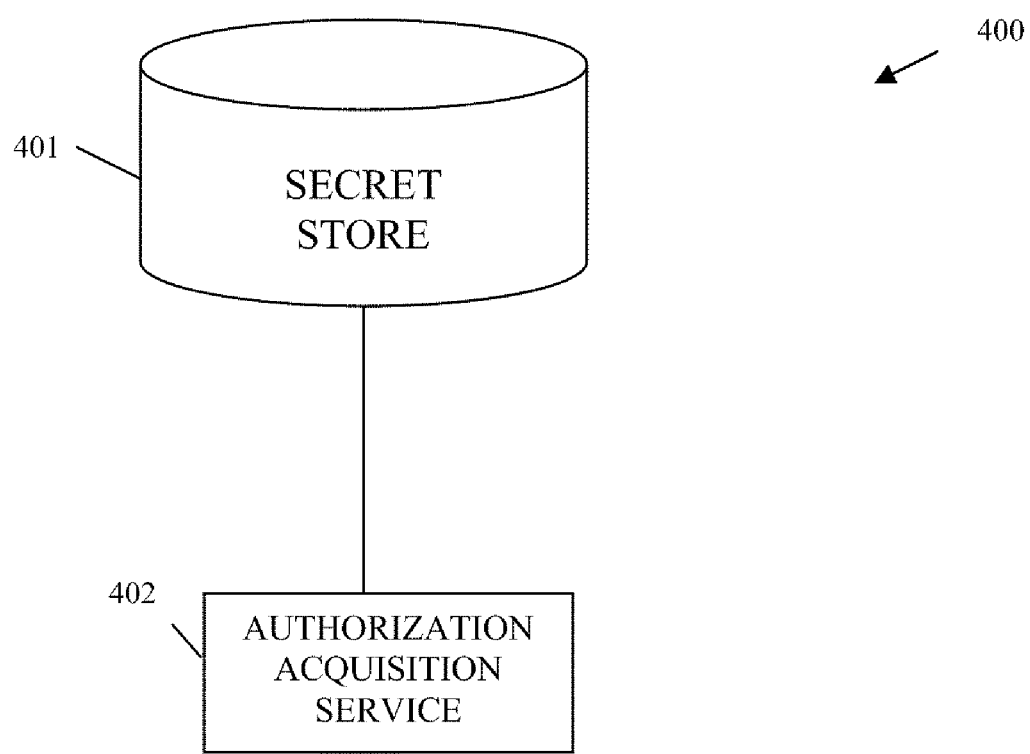
FIG. 4 is a diagram of a remote authorization system, according to an example embodiment.

FIG. 4 is a diagram of a remote authorization system 400, according to an example embodiment. The remote authorization system 400 is implemented in a machine-accessible and readable medium and is accessed and processed over a network. The network may be wired, wireless, or a combination of wired and wireless. The remote authorization system 400 implements, among other things, the authorization acquisition service represented by the method 100 of the FIG. 1. Moreover, the remote authorization system 400 interacts with the remote authorization principal device service represented by the method 200 of the FIG. 2 and with the security system service represented by the method 300 of the FIG. 3.

The remote authorization system 400 includes a secret store 401 and an authorization acquisition service 402. Each of these will now be discussed in turn.

The secret store 401 may be any secure hardware and/or software service that houses access keys or that is capable of producing access keys on demand. The access keys are consumed by a security system service, such as the security system service represented by the method 300 of the FIG. 3 for purposes of authorizing the initiation of a secure operation. Furthermore, the access keys are acquired by the authorization acquisition service (AAS) 402 after the AAS 402 produces one or more secrets to access the secret store 401. The secrets may themselves be considered keys, thus the terminology of secrets and keys may be used interchangeably herein and above. For purposes of illustration the terminology secrets have been used to distinguish what the secret store 401 uses to unlock it versus what the security system uses to initiate the secure operation.

In an embodiment, the secret store 401 may periodically and randomly update or change the access keys or the technique it uses to generate an access key on demand. This random technique is also know to the security system and the security system and the secret store 401 time synchronize or clock synchronize with one another on a periodic bases to ensure that are any particular point in time that both the secret store 401 and the security system have the same access key or set of access keys.

In yet another situation, the secrets used by the AAS 402 to unlock the secret store 401 may also be periodically and randomly updated or changed by both the secret store 401 and security devices or services associated with or accessible to the RAP's. So, as an example, a RAP may have a random key or secret generator that is clock synchronized with the secret store 401, such that at any particular point in time the secret generator will produce a random secret that the secret store 401 will recognize as being valid.

The AAS 402 interacts with three entities the security system, the secret store 401, and RAP's. In some cases, interactions with the RAP's may result in other devices or services communicating with the AAS 402. For example, the actions or procedures of an RAP may result in a secure service, such as a secure WWW service, delivering a secret to the AAS 402.

The AAS 402 receives authorization requests from the security system. Those requests may optionally include a variety of information, such as but not limited to, the identity of one or more RAP's, a procedure to use to acquire the desired access keys, the identity of one or more secret stores 401, etc. It is also noted that some of this information may be preconfigured within the AAS 402, so the specifics as to how and where to get the access keys may be statically resolved or dynamically resolved or various combinations of both static and dynamic. Moreover, the procedures themselves may be random, such that no two situations for authorizing a same security operation within the security system uses a same access key, a same secret store 401, a same RAP, and/or a same procedure that was used with a prior authorization of that security operation.

The AAS 402, in response to authorization requests, sends notifications and other requests to one or more RAP's to acquire secrets that are used to open the secret store 401 and acquire the access key or access keys. Examples of how these notifications occur were described in detail above with respect to the AAS represented by the method 100 of the FIG. 1.

Furthermore, the techniques for receiving the secrets and using the secrets to open the secret store 401 were described in detail above with respect to the AAS represented by the method 100 of the FIG. 1.

Successful unlocking of the secret store 401 produces the access key or keys, which the AAS 402 submits to the security system for purposes of initiating the secure operation within that security system.

Figure 5:
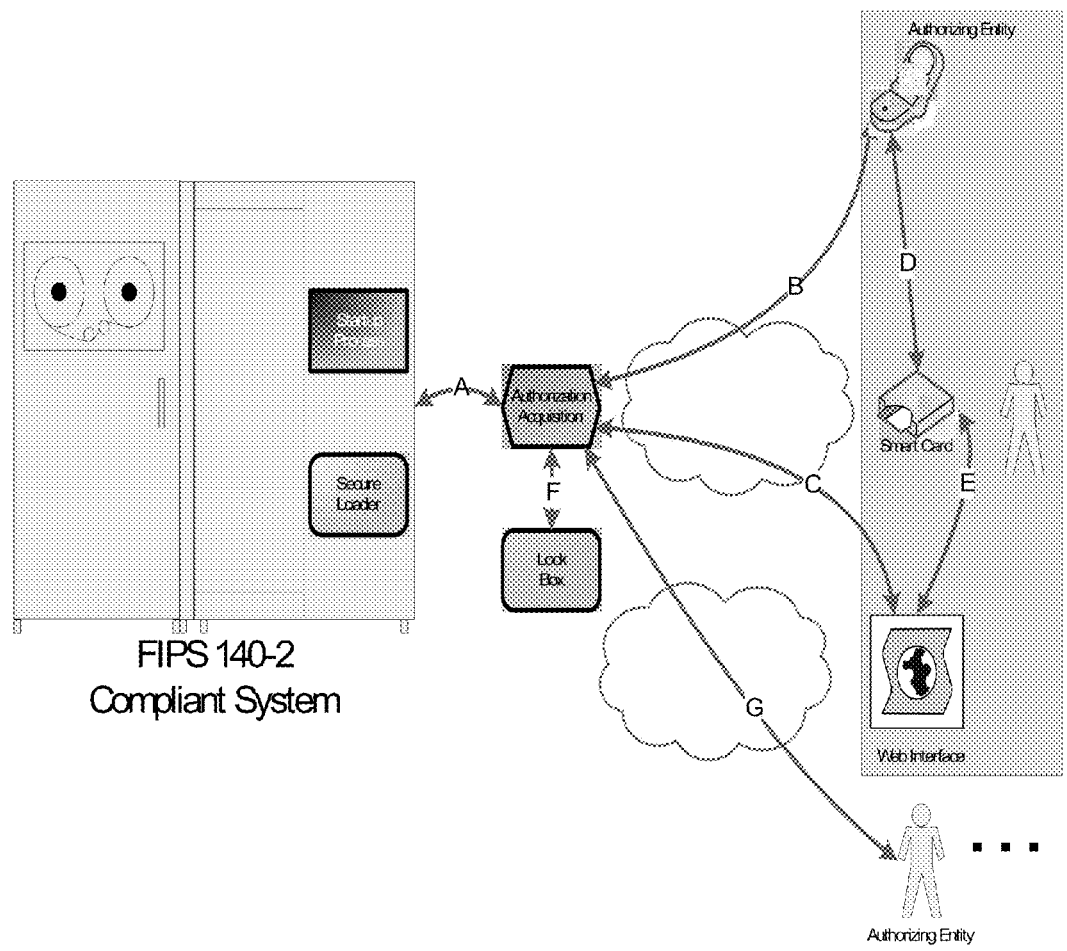
FIG. 5 is a diagram for example interactions that may occur for various components and techniques discussed with the example embodiments.

FIG. 5 is a diagram for example interactions that may occur for various components and techniques discussed with the example embodiments.

The diagram depicts a variety of components that interact with one another and include labels A-G representing data communication and interaction between the components.

An example security system is shown in FIG. 5 as a FIPS 140-2 Compliant System. It interacts direct with an authorization acquisition service via communication link A. So, the FIPS System may receive a resource to execute a secure operation such as the startup process labeled in FIG. 5. Before the startup process is initiated, the FIPS Compliant System sends a request for an access key to the authorization acquisition service over A.

The authorization acquisition service then contacts authorizing entities or devices of the authorizing entities (referred to above as remote authorization principals and the remote authorization principal device service represented by the method 200 of the FIG. 2). Examples of the authorization acquisition service were also provided above with respect to the method 200 of the FIG. 2 and the system 400 of the FIG. 4. It is also noted that the authorization acquisition service may be specialized, dedicated, and secure hardware with software designed to perform the features discussed herein or may be software operational on any secured hardware device, such as a proxy, firewall, gateway, etc.

The authorization acquisition service may include a policy or may be delivered a policy with the request for the access key via A. The policy informs the authorization acquisition service what secrets are needed and how they are to be obtained. It may be that more than one authorizing entity and more than one secret is needed for the authorization acquisition service to obtain the access key or keys from the lock box, or secret store. For example, link G depicts a situation where policy may dictate that two secrets from two separate authorizing entities are needed to unlock the lock box (secret store) and acquire the access key.

In the example presented in FIG. 5, the authorizing entity may be contacted via a cellular, satellite, or mobile phone via communication link B by the authorization acquisition service. As mentioned above a different authorizing entity may also be contacted over link G. Assuming the device of the authorizing entity is a cell phone, then the authorizing entity may receive a request for the secret from the authorization acquisition service as a text message, a voice message, or combinations of text and voice messages. The request for the secret may include multiple messages to identify the situation to the authorizing entity, identity the FIPS System involved, identity the startup procedure, and perhaps identify a location as to where the authorizing entity may acquire the needed secret.

That is, the authorization acquisition service may actually instruct the authorizing entity where to acquire the secret it desires. For example, it may act the authorizing entity to use a smart card or other key generation technique via D and use that key to access a WWW service via E. The WWW service may then upon presentation of the key acquired via D send the secret to the authorization acquisition service via C. The techniques used by the first authorizing entity contacted via B may be the same or different then the techniques used by any needed second authorizing entity to supply its secret via G.

A variety of permutations and processing scenarios may be used by the authorizing entity to directly or indirectly deliver the secret to the authorization acquisition service. For example, the authorizing entity may use touch tone codes to deliver the secret directly to the authorization acquisition service via B. It can be more complicated such that a random key is supplied to the authorizing entity either via B or via D and that random key gets the authorizing entity access to another service where the secret is obtained and either delivered directly to the authorizing entity for delivery via B or delivered on behalf of the authorizing entity via C.

Once the secret or multiple secrets are obtained by the authorization acquisition service, the authorization acquisition service uses the secrets to access a secret store of lock box via F to acquire one or more access keys. These access keys are then supplied to the FIPS System via A. The FIPS System then uses the access key or keys to initiate the startup operation or supplies the access key or keys to a secure loader to initiate the startup process.

The access keys themselves may be independently and randomly changing within the lock box and within the FIPS System. These changes may be temporal-based and/or entirely random. The lock box and the FIPS System are synchronized because they use the same mechanism and are time synchronized with one another such that when an access key changes it is changed on both the lock box and the FIPS System.

One now fully appreciates how a secure and remote authorization technique may be implemented to authorize an operation of a security system. This technique complies with FIPS 140-2 and, among other things, may be used to eliminate the physical presence requirements of FIPS Crypto Officers without sacrificing security procedures.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method to execute on a machine, comprising:
   detecting, by the machine, a request for initiating a secure operation;
   evaluating, by the machine, a policy associated with authorizing the secure operation for initiation, the policy drives a processing flow and procedures that must be used to acquire one or more access keys and content for the one or more access keys that are expected before the request is authenticated and initiated, the processing flow and procedures randomly generated via the policy evaluation;
   making, by the machine, a request to an authorization acquisition service to acquire the one or more access keys pursuant to the policy from one or more remote authorization principals; and
   receiving and verifying, by the machine, the one more access keys, which are received from the authorization acquisition service in response to one or more secrets obtained from the one or more remote authorization principals.

2. The method of claim 1, wherein making further includes supplying one or more identifiers for the one or more access keys or supplying a procedure for acquiring the one or more access keys with the request to the authorization acquisition service.

3. The method of claim 1 further comprising, periodically synchronizing, by the machine, with a secret store to ensure the secret store has the one or more access keys, and wherein the secret store is accessed by the authorization acquisition service in response to one or more secrets obtained from the one or more remote authorization principals.

4. The method of claim 1 further comprising, supplying, by the machine, the one or more access keys successfully received from the authorization acquisition service to a secure loader, wherein the secure loader initiates the secure operation.

5. The method of claim 1, wherein detecting further includes detecting an attempt to boot up a particular device or particular service associated with a security system, which raises the request.

6. The method of claim 1, wherein detecting further includes detecting an attempt to shutdown a running service, which raises the request.

7. The method of claim 1, wherein making further includes voiding the one or more access keys when the authorization acquisition service fails to deliver the one or more access keys within a defined period of time included in the policy.

8. A machine-implemented method to execute on a machine, comprising:
 receiving, by the machine, a request to initiate a secure operation within a secure system;
 acquiring, by the machine, multiple keys from multiple different certified crypto officers, each crypto officer having one of the multiple keys and each crypto officer remotely communicating his/her key from a remote geographic location from that geographical location associated with the secure system and each crypto officer given different instructions on how each of his/her keys are to be communicated and the instructions change with every subsequent request to initiate the secure operation and the instructions are randomly generated, wherein acquiring further includes identifying each of the certified crypto officers via a policy associated with the secure operation of the secure system;
 using, by the machine, the multiple keys to acquire a secret from a secret store to initiate the secure operation; and
 initiating, by the machine, the secure operation via the secret.

9. The method of claim 8, wherein acquiring further includes interacting with one crypto officers via a phone using voice instructions and interacting with another crypto officer via a phone using text messages to acquire the multiple keys.

10. The method of claim 8, wherein acquiring further includes using a policy that defines a particular mechanism for each certified crypto officer to deliver his/her key.

11. The method of claim 8, wherein acquiring further includes using a policy to instruct each of the certified crypto officers on how and where to obtain his/her key.

12. The method of claim 8, wherein using further includes randomly changing the secret within the secret store and configuring the secure operation to accept the changing secret.

\* \* \* \* \*

UNITED STATES PATENT AND TRADEMARK OFFICE
CERTIFICATE OF CORRECTION

PATENT NO. : 8,327,417 B2
APPLICATION NO. : 12/871163
DATED : December 4, 2012
INVENTOR(S) : Carter et al.

It is certified that error appears in the above-identified patent and that said Letters Patent is hereby corrected as shown below:

On the cover page, in column 1, under "Inventors(75)", line 1, delete "R" and insert --R.--, therefor On the cover page, in column 2, under "Other Publications", line 1, delete "et al," and insert --et al.,--, therefor On the cover page, in column 2, under "Other Publications", line 1, before "A", insert --"--, therefor On the cover page, in column 2, under "Other Publications", line 2, delete "FIPS 140-2," and insert --FIPS 140-2",--, therefor On page 2, in column 1, under "Other Publications", line 1, delete "et al," and insert --et al.,--, therefor On page 2, in column 1, under "Other Publications", line 1, before "Entrust", insert --"--, therefor On page 2, in column 1, under "Other Publications", line 2, after "Policy", insert --",--, therefor On page 2, in column 1, under "Other Publications", line 5, before "VPN1", insert --"--, therefor On page 2, in column 1, under "Other Publications", line 5, after "Intelligence", insert --"--, therefor On page 2, in column 1, under "Other Publications", line 7, delete "Ltd," and insert --Ltd.,--, therefor On page 2, in column 1, under "Other Publications", line 8-9, delete "Entrust Cryptographic Module 6.0, FIPS 140-1 Validation Security Policy, Pierre Boucher, pp. 1-16, Entrust, 2003.*" and insert --Pierre Boucher, "Entrust Cryptographic Module 6.0", FIPS 140-1 Validation Security Policy, pp. 1-16, Entrust, 2003.*--, therefor On page 2, in column 2, under "Other Publications", line 1, before "SafeNet", insert --"--, therefor
On page 2, in column 2, under "Other Publications", line 1, after "Module", insert --"--, therefor Signed and Sealed this
Fifth Day of March, 2013

Teresa Stanek Rea
*Acting Director of the United States Patent and Trademark Office*

CERTIFICATE OF CORRECTION (continued)
U.S. Pat. No. 8,327,417 B2

On page 2, in column 2, under "Other Publications", line 3, before "Entity", insert --"--, therefor On page 2, in column 2, under "Other Publications", line 3, after "Cryptography", insert --"--, therefor On page 2, in column 2, under "Other Publications", line 6, after "11/392,195", insert --,--, therefor On page 2, in column 2, under "Other Publications", line 19, after "07103082.9", insert --,--, therefor On page 2, in column 2, under "Other Publications", line 31, delete "requirements for cryptographic modules" and insert --Requirements for Cryptographic Modules--, therefor On page 2, in column 2, under "Other Publications", line 35, delete "Modules-" and insert --Modules--, therefor On page 2, in column 2, under "Other Publications", line 38, delete "B, "","" and insert --B., "Basic Protocol"--, therefor On page 2, in column 2, under "Other Publications", line 39, delete "566" and insert --566-572--, therefor On page 2, in column 2, under "Other Publications", line 40, delete "A," and insert --A.,--, therefor In column 12, line 50, in Claim 1, delete "one more" and insert --one or more--, therefor In column 14, line 12, in Claim 9, delete "officers" and insert --officer--, therefor